United States Patent [19]

Paulus

[11] Patent Number: 5,250,006
[45] Date of Patent: Oct. 5, 1993

[54] TENDERIZER

[76] Inventor: Daniel S. Paulus, 1120 chaussée de Ninove, 1080 Bruxelles, Belgium

[21] Appl. No.: 942,890

[22] Filed: Sep. 10, 1992

[30] Foreign Application Priority Data

Sep. 10, 1991 [BE] Belgium .............................. 09100840
Sep. 10, 1991 [BE] Belgium .............................. 09200717

[51] Int. Cl.⁵ .................................................. A22C 9/00
[52] U.S. Cl. ...................................................... 452/141
[58] Field of Search ................. 452/141, 144, 146, 147

[56] References Cited

U.S. PATENT DOCUMENTS

| | | | |
|---|---|---|---|
| 2,293,789 | 8/1942 | Abbott | 452/141 |
| 2,322,243 | 6/1943 | Carson et al. | 452/141 |
| 3,900,918 | 8/1975 | Allinquant et al. | 452/141 |
| 4,287,642 | 9/1981 | Jaccard et al. | 452/141 |
| 5,085,614 | 2/1992 | Bourret | 452/141 |

Primary Examiner—Willis Little
Attorney, Agent, or Firm—Keck, Mahin & Cate

[57] ABSTRACT

Tenderizer, especially for butchers' meat, comprising: a tray to receive a piece of meat to be tenderized, a movable device (8) having support means (5) for a grid (4) which is intended to immobilize and hold the piece on the tray during the tenderizing operations, and tenderizing knives (2) intended to interact with the abovementioned grid (4) and mounted on a movable support (3), the knives (2) being mounted on the aforementioned movable support (3) by the intermediary of an auxiliary support (55), the latter being articulated to the aforementioned movable support (3) about a shaft carried by this latter support (3) and whose axis (59) is parallel to the direction of movement of said movable support.

2 Claims, 3 Drawing Sheets

TENDERIZER

The present invention relates to a tenderizer, especial for butchers' meat, comprising:
- a tray to receive a piece of meat to be tenderized,
- a movable device having support means for a grid which is intended to immobilize and hold the piece of meat on the tray during the tenderizing operations, inter alia during the raising of the knives, and
- tenderizing knives intended to interact with the abovementioned grid and mounted on a movable support.

Tenderizers known to date all have the drawback of being equipped with knives which, during their frequent dismantlings, cause the user to run serious risks of particularly severe injuries given the shapes of the cutting edges of the knives and their sharpness. These frequent dismantlings are for example necessary for cleaning and sterilizing the elements which come into contact with the pieces of meat.

The object of the invention is to overcome this drawback and to provide a tenderizer in which the manipulations of the knives are without risk to the user.

According to the invention, the knives are mounted on the aforementioned movable support by the intermediary of an auxiliary support, the latter being articulated to the aforementioned movable support about a shaft carried by this latter support and whose axis is parallel to the direction of movement of said movable support, so as to allow disengagement of the knives from the movable support by pivoting about said axis, means being provided for temporarily immobilizing the auxiliary support with respect to the movable support.

Other details and particularities of the invention will emerge from the description of the drawings which are appended to the present document and which illustrate, by means of nonlimiting examples, a particular embodiment of the tenderizer according to the invention.

In the various figures, the same reference notations designate identical or similar elements.

Figure 1:
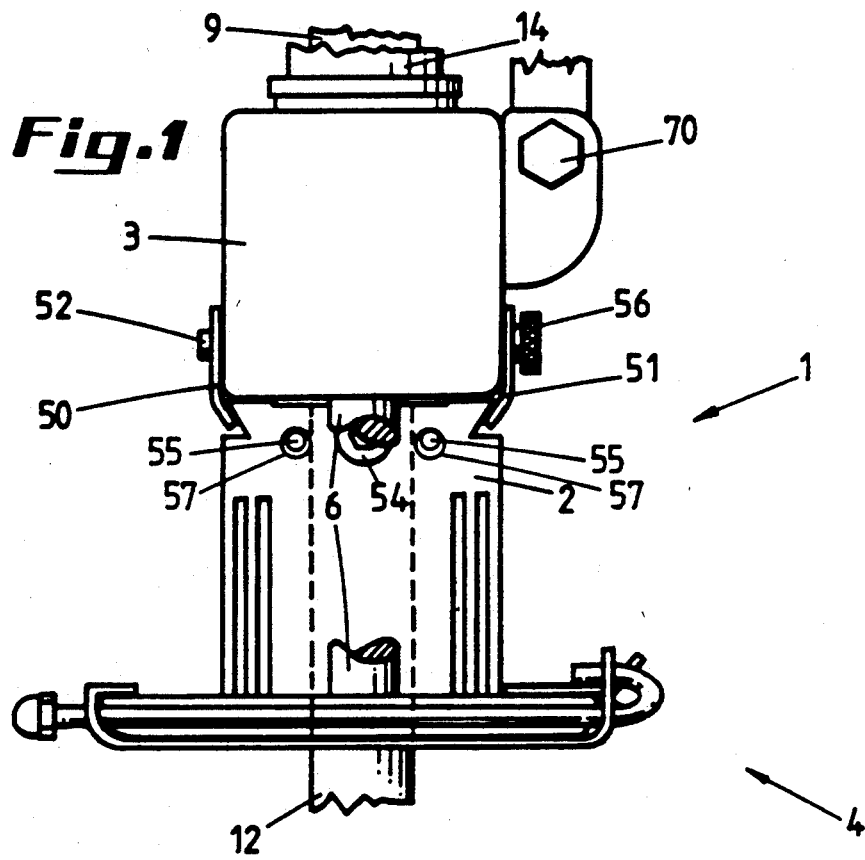
FIG. 1 is a diagrammatic side elevation, in partial cutaway, of the tenderizer according to the invention.

The tenderizer according to the invention and illustrated in the drawings is designated overall by the reference 1. This tenderizer 1 generally comprises a tray (not shown) upon which a piece of meat (not shown) to be tenderized is placed, the plate usually being easy to detach from the tenderizer in order to be cleaned and sterilized.

The tenderizer 1 also comprises tenderizing knives 2 fixed for example under a movable support 3, the latter being able to be activated in a descending movement to embed the knives 2 in the piece of meat to be tenderized or in a raising movement to remove the knives 2 therefrom. The movable support 3 is guided for example (FIG. 4) by two columns 12 which are vertical and perpendicular to the tray and connected to one another by a strut 13.

In order, inter alia, to hold the piece of meat on the tray during the raising of the movable support 3, it is usual to place, between the knives 2, bars forming a grid 4 which bears on the piece of meat, during the descent of the movable support 3, before the knives 2 enter the piece of meat and which leaves the latter after these same knives 2 have come out of said piece of meat. A grid 4 of this type is for example described in BE-A-09100840 filed by the same applicant.

In order to guide and control the grid 4 starting for example from the movements of the movable support 3, a movable device 8 known per se which has support means 5 (FIG. 4) for said grid 4 is provided, these support means 5 being represented in the present example in the shape of two parallel uprights 6 (FIGS. 1 to 4) which each advantageously comprise a shoe 7 fixed at their lower end in order to constitute an adequate bearing and a fixing surface for the grid 4. The uprights 6 may be connected together by a cross-member 9 and slide in guide bushes 10 arranged in the movable support 3. The two ends of the cross-member 9 may each enter an annular groove of a known locking and stop ring 14 sliding along a corresponding column 12. The position of the rings 14 in FIG. 4 corresponds to the rest position of the tenderizer 1, the grid 4 not being in contact with the piece of meat. The uprights 6 are further advantageously parallel to the columns 12.

The link between the cross-member 9 and the uprights 6 is advantageously produced by pinching the latter in order to allow for example adjustment of the distance between the tray and shoes 7 by freeing one or both uprights 6 and sliding them across the cross-member 9.

Figure 2:
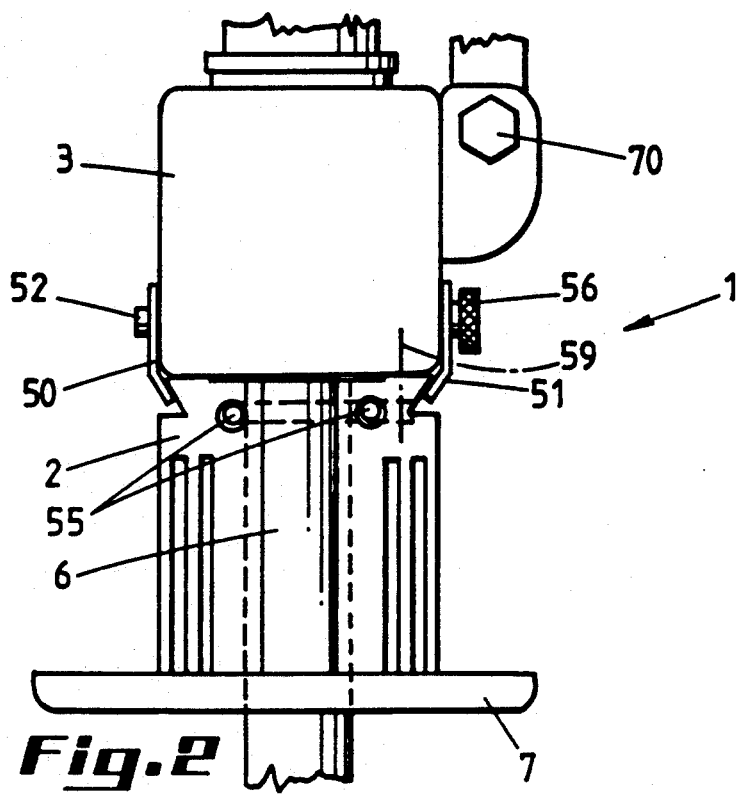
FIG. 2 illustrates, in partial cutaway, the tenderizer after the grid has been dismantled.
Figure 3:
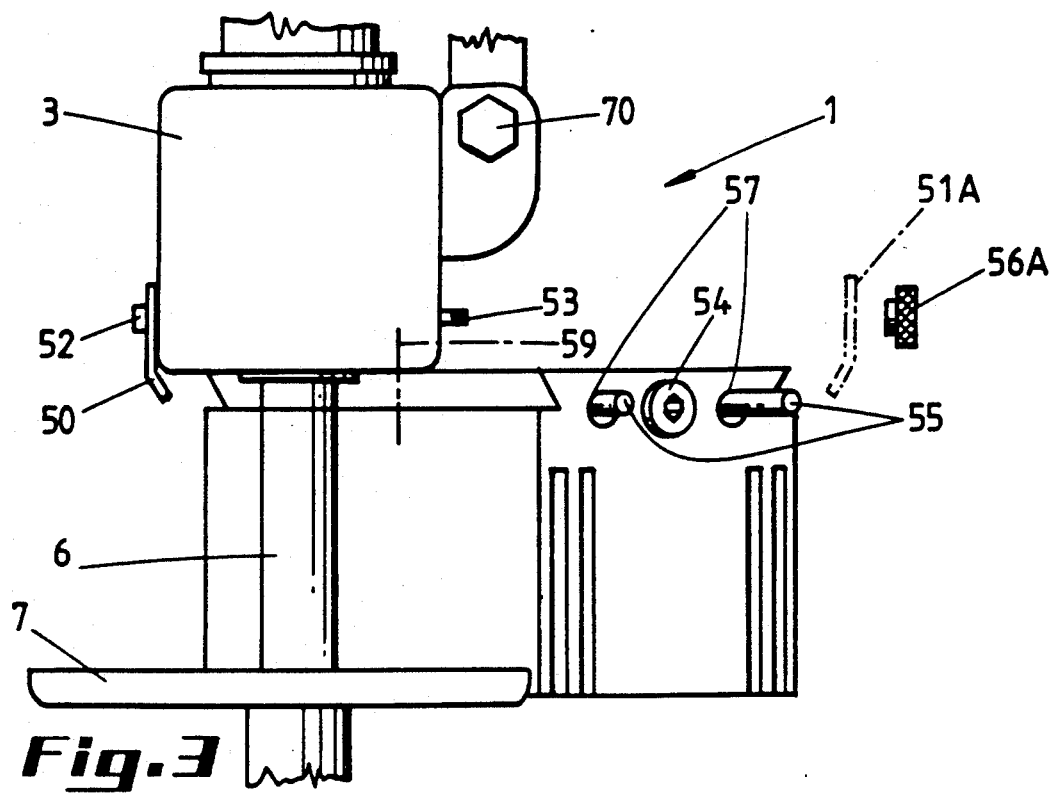
FIG. 3 is a view similar to FIGS. 1 and 2, and shows the knives in the course of being disengaged from the tenderizer.

According to FIGS. 1 to 3, the tenderizing knives 2 may be fixed to the movable support 3 by clamping between a fixed flange 50 and a removable flange 51 situated on either side of the knives 2, the fixed flange 50 being held on a vertical face of the movable support 3 for example by screws 52 whose threaded end 53 may emerge via the opposite vertical face of said movable support 3 (FIG. 3). The threaded ends 53 may for example then each receive a knurled nut 56 in order to fix without tools the removable flange 51 to the movable support 3.

The knives 2 may be free with respect to one another and arranged at a distance from one another by known spacing elements in order to pass each time between two bars of the grid 4. The knives 2 may be assembled in blocks of knives in a manner known per se, by means for example of a rod and screw assembly 54 (FIGS. 1 and 3), so as to maintain the aforementioned distance between the knives. The flanges 50 and 51 and the end of the knives 2 on the movable support 3 side may have a type of dovetail clamping in order to press, by clamping, the upper faces of the knives 2 against the lower face of the movable support 3. Stops, not shown, may be provided in order to locate the knives 2 with respect to the grid 4 between the two uprights 6.

According to the invention, the knives 2 are mounted on the movable support 3 by the intermediary of an auxiliary support composed, in the embodiment illustrated, of two rods 55 parallel to one another and, as the drawings show, parallel to the lower face of the movable support 3. These parallel rods 55 pass through suitable holes 57 in the knives and are carried at one of their ends, to the right of FIG. 4, by an element 58 fixed to a shaft whose axis bears the reference 59 in FIGS. 3 and 4. This shaft which is parallel to the columns 12 is mounted in a manner known per se in the movable support 3 in order to be able to pivot about an axis 59 so that the parallel rods 55 can occupy, inter alia, a position parallel to the clamping flanges 50 and 51 when the knives 2 on the parallel rods 55 are in the tenderizing position and a disengaged position (in the direction of the arrow 60 in FIG. 4) when the removable flange 51 is taken away, this disengaged position being illustrated after pivoting in FIGS. 3 and 4. The pivoting of the rods 55 thus takes place substantially parallel to the lower face of the movable support 3 against which the knives 2 are pressed into the tenderizing position.

Figure 4:
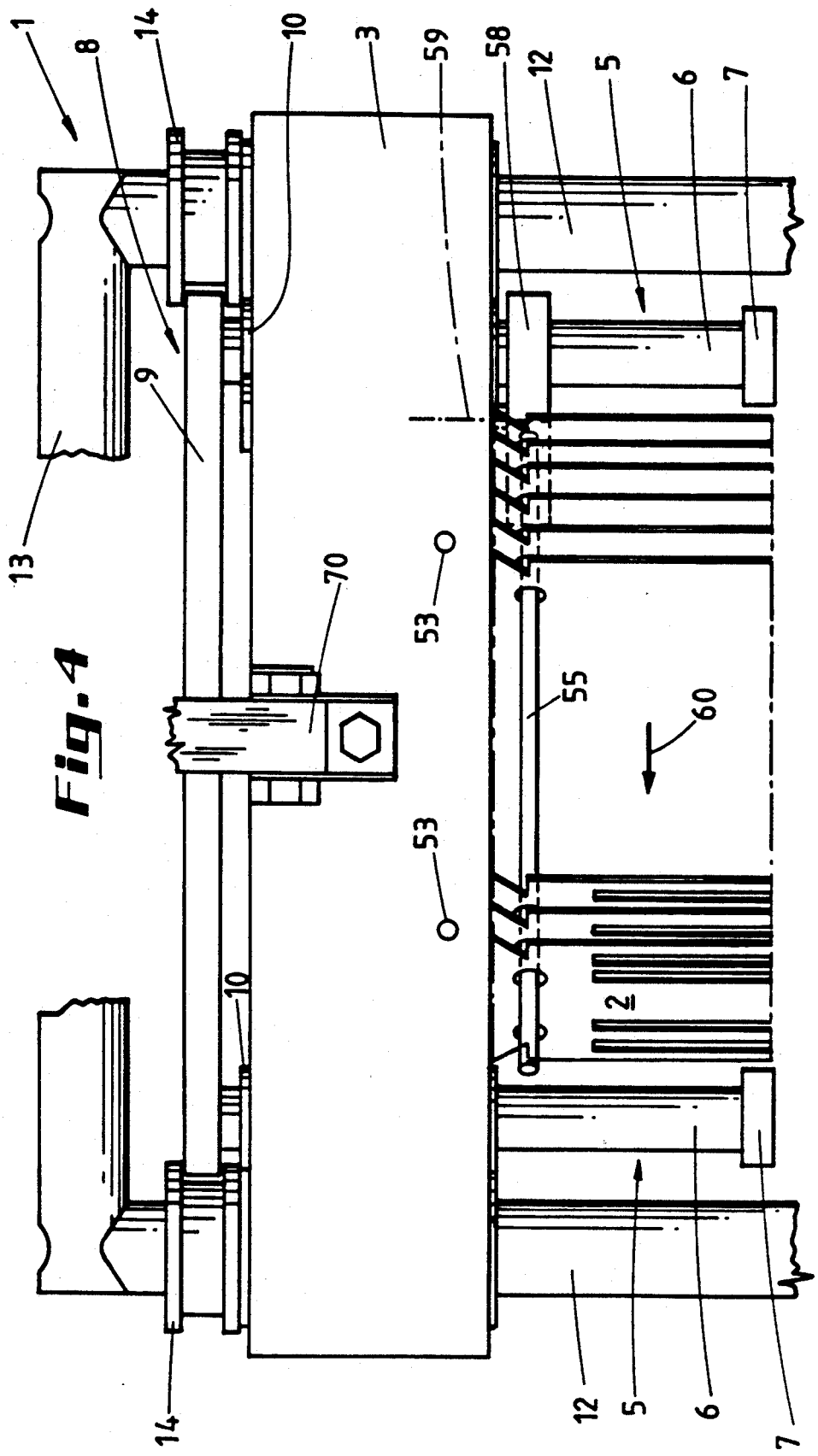
FIG. 4 shows in a diagrammatic front view, in partial cutaway, a subsequent stage of dismantling the knives.

Mounting of the knives 2 in the tenderizer can be carried out, without having to manipulate them by their tapered sides, by holding them either separately or as a block by their dovetail end in order to fit them in the direction opposite to the arrow 60 over the parallel rods 55 pivoted into the position represented in FIGS. 3 and 4. Next, by pivoting, the knives 2 are brought under the movable support 3, the spacing between the latter and the parallel rods 55 being provided so that the upper face of the knives 2 is practically against the lower face of said movable support 3. The flange 51 and the knurled nuts 56, represented in the moved away position in FIG. 3 under references 51A and 56A, are installed as represented in FIG. 2 and the tightening of the knurled nuts 56 gives rise to immobilization gripping of the knives 3, between flanges 50 and 51 and the lower face of the movable support 3. The immobilization of the parallel rods 55 situated in the knives 2 automatically results therefrom.

Dismantling of the knives 2 is carried out in the opposite direction to the aforementioned mounting.

The reference 70 designates the end of a control device, known per se, for moving the movable support 3 during tenderizing.

It must be understood that the invention is in no way limited to the embodiments described and many modifications may be made to the latter without departing from the scope of the present invention. Thus, instead of gripping by the flanges 50 and 51, immobilization of the parallel rods 55 and thus of the knives 2 may be carried out by suitable immobilization of the free ends of the parallel rods 55 with respect to the movable support 3.

I claim:

1. A tenderizer, especially for butchers' meat, comprising:
    a tray to receive a piece of meat to be tenderized,
    a movable device having support means for a grid which is intended to immobilize and hold the piece of meat on the tray during the tenderizing operations, and
    tenderizing knives intended to interact with the abovementioned skid and mounted on a movable support,
wherein the knives are mounted on the aforementioned movable support by the intermediary of an auxiliary support, the latter being articulated to the aforementioned movable support about a shaft carried by this latter support and whose axis is parallel to the direction of movement of said movable support, so as to allow disengagement of the knives from the movable support by pivoting about said axis, means being provided for temporarily immobilizing the auxiliary support with respect to the movable support.

2. The tenderizer as claimed in claim 1, wherein the auxiliary support is composed of at least one rod fixed, by one of its ends, to the aforementioned shaft perpendicular to the latter and parallel to the movable support, the separate knives or a set of knives forming a single block being fitted over said rod, the abovementioned means provided for temporarily immobilizing the auxiliary support with respect to the movable support being composed of two flanges parallel to the rod when the auxiliary support occupies its tenderizing position and arranged on the movable support in order to grip the knives on either side of the rod.

* * * * *